John A. French
Elbert L. Owen,
INVENTORS.

Nov. 22, 1966    J. A. FRENCH ETAL    3,286,955
LOW ALTITUDE AIR DEFENSE SYSTEM AND METHOD
Filed Jan. 28, 1963    3 Sheets-Sheet 2

John A. French
Elbert L. Owen,
INVENTORS.

BY S. J. Rotondi
   A. J. Dupont
   Alfred E. Smith

United States Patent Office

3,286,955
Patented Nov. 22, 1966

3,286,955
LOW ALTITUDE AIR DEFENSE SYSTEM
AND METHOD
John A. French, Huntsville, and Elbert L. Owen, Harvest, Ala., assignors to the United States of America as represented by the Secretary of the Army
Filed Jan. 28, 1963, Ser. No. 254,511
4 Claims. (Cl. 244—14)

The invention described herein may be used by or for the Government for governmental purposes without the payment of any royalty thereon.

This invention relates to a system and a method for gathering low altitude target data and using this data in a command guidance missile system.

The problem of defending targets within the continental United States and other areas is continually concerned with the difficulty of intercepting very low flying aircraft. This is a basic problem whether the defensive weapon is an anti-aircraft missile system, gun, or interceptor aircraft. A basic reason for this is that many or all of the sensory elements required to detect and locate the position of the target are normally located on the surface of the earth. In the predominance of these cases the sensors are radars working in the microwave region of the RF spectrum (1,000 mc. to 10,000 mc.). As a general rule, range or distance at which a target may be detected by a ground based radar is given by the equation: $R = 1.23 (\sqrt{H_t} + \sqrt{H_r})$, where R is the range in nautical miles, $H_t$ is the height of the target, and $H_r$ the height of the radar in feet. The above general equation is useful under fairly ideal situations where there are no obstructions in the line-of-sight between the radar and the target. It is apparent that the ability to pick the very best site of locating the radar is of interest in optimizing the range of detection but that R will be very small unless either $H_t$ or $H_r$ is very large. In considering the overall problem of intercepting an approaching aircraft the inherent delays within the defensive system must also be taken into account. For example, the times lost in an operator detecting a target, in slewing radar antennas and in positioning missiles or components all combine to allow the enemy to approach even closer than the ideal detection range. Even after the interceptor missile is launched, the target continues to approach while the defensive missile is in flight, so that it is very likely that the enemy can accomplish his mission in spite of an otherwise successful defensive operation. For the offensive weapon to improve its likelihood of survival in penetrating a defensive complex, it will normally use the tactics of high speed and the ability to follow and take advantage of the terrain features. This is achieved either through the skill of the pilot or the automation of an aerodynamic missile. From the above it has been determined that there is need for improvement of missile technology. The basic problem can be stated as one of giving "depth" to the defense without sacrificing many of the other capabilities of a defense system such as accuracy and ability to control flight of the missile. By "depth," it is meant a capability to intercept the enemy aircraft at greater distances from the defended area. This is useful both in enabling the defense to attack multiple targets and in giving assurance that the defensive system itself will not be destroyed by "dead-man fuzing" of the enemy's warhead.

It is an object of the present invention to provide a method of improving the low altitude capability of air defense systems.

Another object of this invention is to provide an improved method of detecting and intercepting low altitude aircraft.

A still further object of this invention is to provide an improved system for detecting and intercepting low altitude aircraft.

These and other objects and advantages of the invention will become apparent from the following detailed description and from the accompanying drawings, in which.

Figure 1:
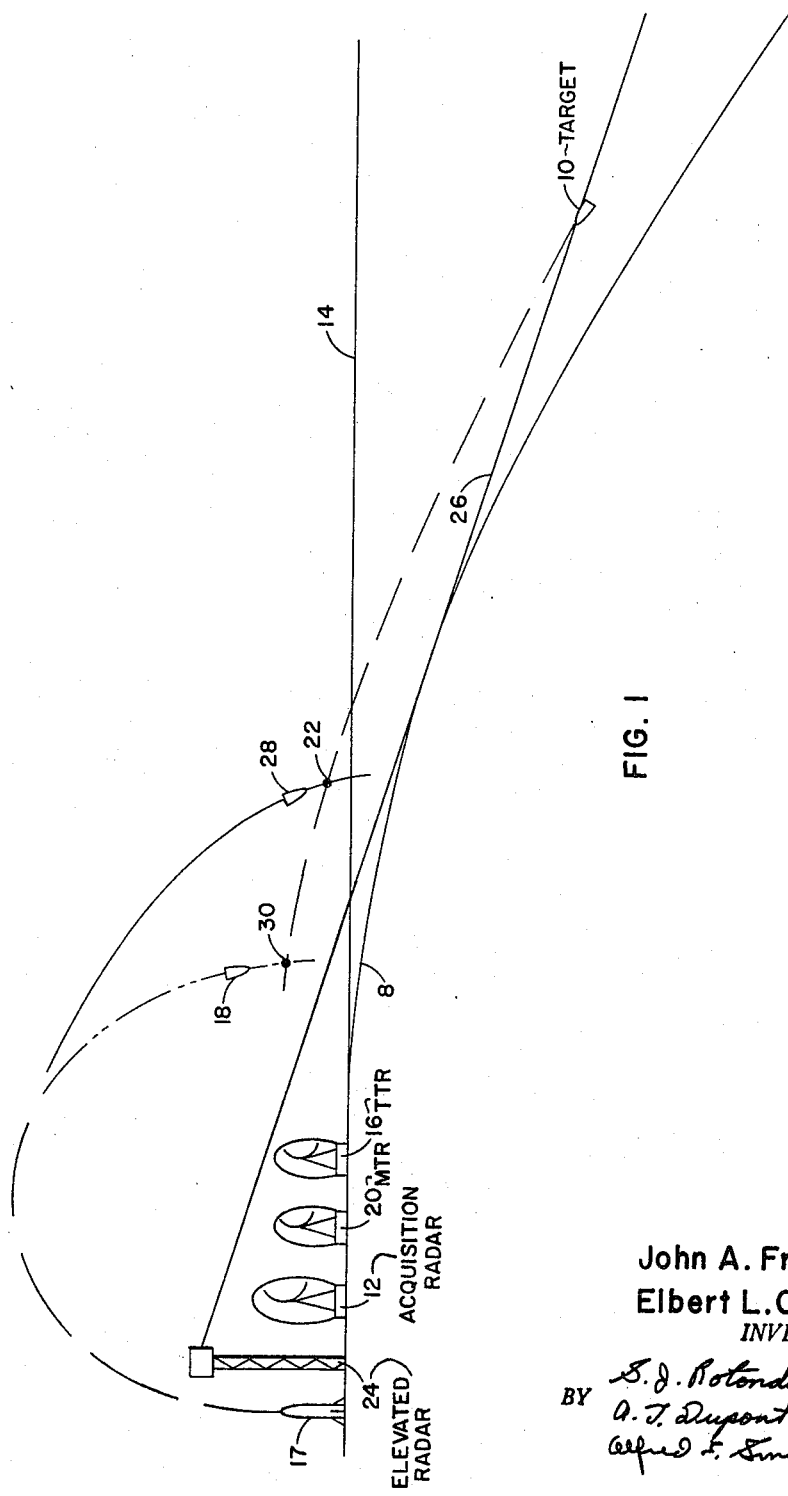
FIGURE 1 is a diagrammatic view illustrating the operation of the present invention.

The invention is illustrated in FIGURE 1 wherein reference numeral 10 represents a target to be detected by an elevated acquisition radar (EAR) 24 when the target intersects line 26. Also shown in the drawing is a conventional ground located acquisition radar 12 capable of detecting the target when it intersects line 14. The system further includes a target tracking radar (TTR) 16 and a missile tracking radar (MTR) 20 for controlling a missile 17.

Figure 2:
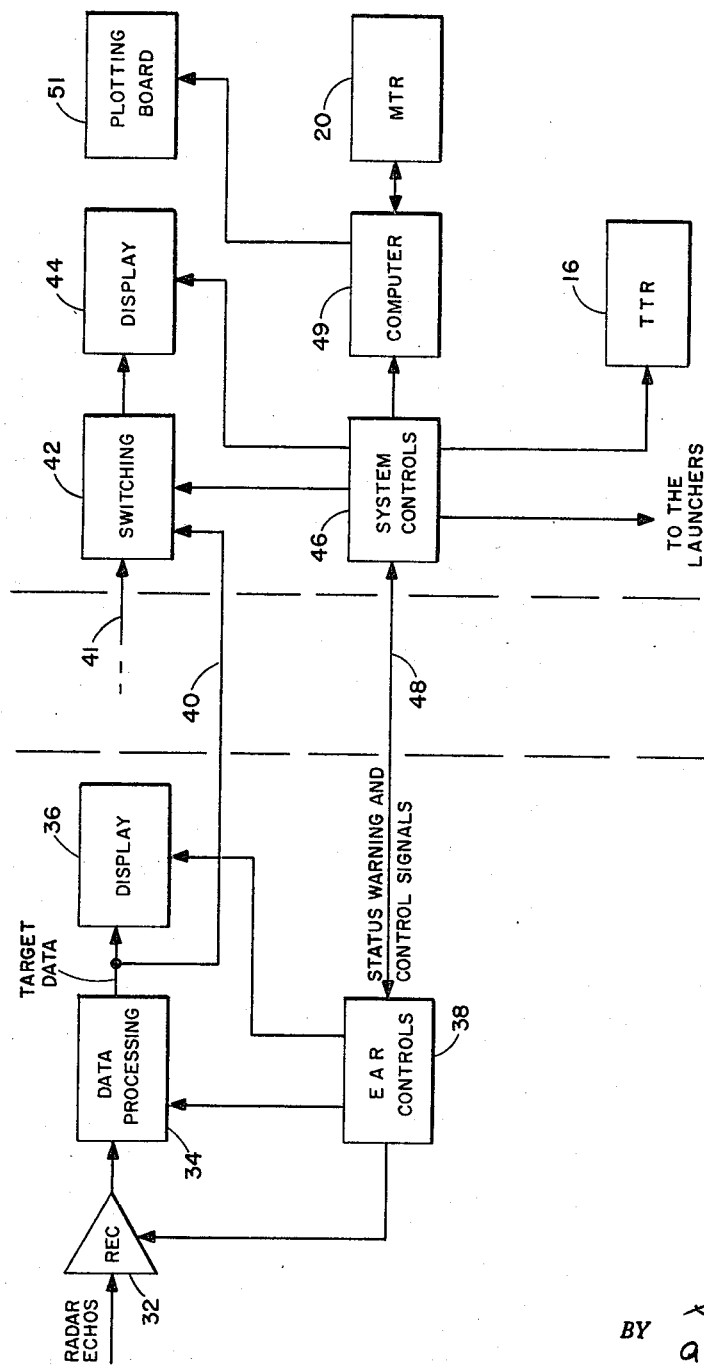
FIGURE 2 is a block diagram illustration of the radar system.

The systems control and display circuits are illustrated in FIGURE 2 wherein a receiver 32 is provided for amplifying radar echoes from the EAR. These amplified signals are then transmitted to a data processing system 34 which prepares the signals for display on a display scope 36. An operator performs the necessary functions associated with computing or otherwise determining target azimuth, range and velocity. This is accomplished by the operator observing the processed data on display scope 36 and then manipulating controls in the data processing system and EAR controls 38 accordingly. These function could also be carried out with any of several automatic tracking systems. The processed data is then transferred through line 40 to switching means 42 in the missile system which is necessary to perform a switching function so that data can be displayed in display 44 without interrupting other data from the ground located acquisition radar which enters through line 41. This switching function is normally accomplished by using intervals between PPI sweeps. The information displayed on display scope 36 is used to keep an operator at the launch site informed when a target has been detected. This information is also fed to a computer 49 which is connected to plotting-board 51 and MTR 20. A system control 46 is provided for exchanging status, warning, and control signals with the EAR over line 48 and enables the operator to control the launching of missile 17. Computer 49 provides the necessary information to plotting-board 51 for displaying target azimuth, range, predicted and actual points of intercept on an overlay through which an appropriate scale map of the local terrain appears. The TTR will be positioned in azimuth and range by referring to coordinates of the data from the EAR as it appears on display 44. This data gives range and azimuth but not the elevation of the target. The TTR operators must therefore set the elevation of the radar to a position pointing at the horizon, at the azimuth of the target.

Figure 3:
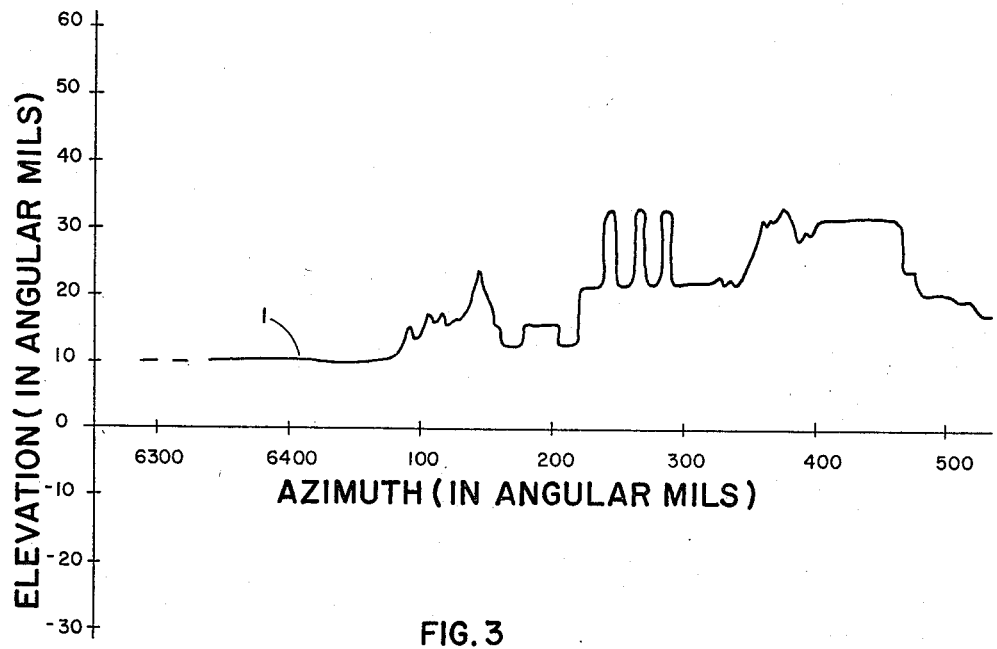
FIGURE 3 is a graph showing the relationship between radar elevation and azimuth.

One method of determining the elevation of the TTR is to prepare a graph as shown in FIGURE 3. Only one section of this graph is shown here, it being understood that it would normally cover the azimuth regions of interest which could be from 0 to 6400 angular mils or any part of this amount. The abscissa of this graph represents the azimuth angle shown in this case in angular mils, and the ordinate represents the radar masking angle in elevation as viewed from a particular site. The method of preparing the appropriate graph involves the operator setting the elevation of the radar to the highest elevation angle where ground clutter appears on the radar scope and recording this setting for each azimuth setting at about ½ degree intervals.

Figure 4:
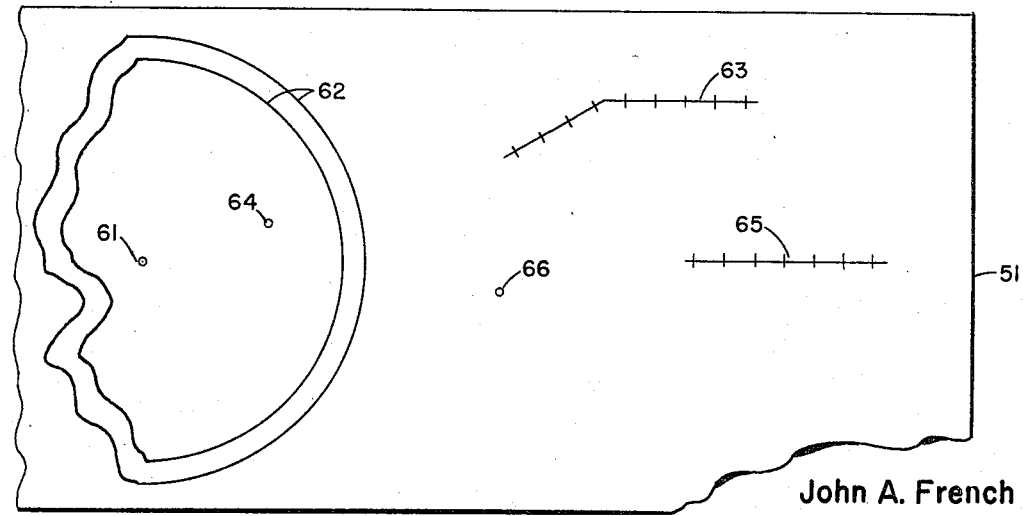
FIGURE 4 illustrates a plotting-board map for displaying target "tracks" and intercept points.

Details of plotting-board 51 are shown in FIGURE 4. The missile battery is located at 61 and the irregular lines 62 indicate the horizon as viewed from the TTR at 61. A "track" is established on a target of interest 63 and the predicted intercept position is shown at position 64. The small cross lines on the track are timing markers and give an indication of target speed. A second track 65 is shown having a predicted intercept point 66 falling outside lines 62. In this case, in the interest of accuracy, it would be prudent for the battery commander to wait and launch the missile so that intercept takes place within the area enclosed by lines 62. Lines 62 may be drawn from topographical data, intelligence data, test (as for FIGURE 4), experience in exercises or combinations of these sources.

In the operation of the above disclosed system the EAR detects the target appreciably sooner than the conventional radar 12 because it is able to see over the normal terrain and horizon. Target 10 then will be detected as soon as it intersects line 26 whereas using the conventional radar the target would not be detected until it intersected line 14, which is the normal line-of-sight or horizon. After a very short time (about two seconds) a "track" can be established on this target. The target tracking radar can be immediately positioned on this track even though the target is not within sight from the TTR location on the ground. This is possible by virtue of the accuracy of information obtainable from EAR 24. After the TTR is positioned the computer can be enabled and a missile launched in the normal missile system fashion. Note that before a missile is launched it is necessary only to determine that the target will rise above the horizon prior to the missile completing the intercept. This is possible to compute since the missile system has the capability to predict how long it takes a missile to reach a certain point and the information obtained from the EAR enables a prediction of how long it will take the target to reach the same point. Very shortly after the target reaches line 14 the TTR will detect the target and will begin tracking in its normal fashion. The significance of this is that the positional information fed into the intercept computer on the target will now be several orders of magnitude more accurate than obtainable by an elevated acquisition radar (approximately 100 to 1 better). At this time the missile has reached the position 28 and the guidance and complete missile system operation from this point is the same as the normal system functioning. The difference is that there has been a very important saving of time in completing the destruction of the target, so that the target is destroyed at position 22 rather than at position 30 or conceivably not at all.

While we have described above the principles of our invention in connection with specific apparatus, it is to be clearly understood that this description is made only by way of example and not as a limitation to the scope of our invention as set forth in the accompanying claims.

We claim:

1. A system for detecting and intercepting low altitude aircraft comprising: an elevated acquisition radar for scanning an area of expected attack and thereby detecting the presence of said aircraft prior to its appearance above the horizon; a ground located target tracking radar for tracking said aircraft after its appearance above the horizon, said target tracking radar connected to said elevated radar whereby the initial position of said target tracking radar is controlled by said elevated radar; means responsive to said elevated acquisition radar for launching a missile prior to the appearance of said aircraft above the horizon; a missile tracking radar; and means responsive to said target tracking radar and said missile tracking radar for controlling the course of said missile, whereby said aircraft is intercpeted by said missile.

2. A system for detecting and intercepting low altitude aircraft comprising: an elevated acquisition radar for scanning an area of expected attack and thereby detecting the presence of said aircraft prior to its appearance above the horizon; a ground located target tracking radar for tracking said aircraft after its appearance above the horizon; means responsive to said elevated acquisition radar for positioning said target tracking radar; means responsive to said elevated radar for launching a missile prior to the appearance of said aircraft above the horizon; a missile tracking radar; and means responsive to said target tracking radar and said missile tracking radar for controlling the course of said missile whereby said aircraft is intercepted by said missile.

3. A method of detecting and intercepting low altitude aircraft comprising the steps of: scanning an area of expected attack with an elevated acquisition radar; indicating on a scope the presence of said aircraft prior to its appearance above the horizon; processing information obtained from said elevated acquisition radar for positioning a ground located target tracking radar; launching a missile when said aircraft is detected by said elevated acquisition radar; tracking said aircraft with said tracking radar when said aircraft rises above the horizon; and controlling said missile with said target tracking radar and a missile tracking radar for causing said missile to intercept said aircraft.

4. The method of detecting and intercepting low altitude aircraft comprising the steps of: scanning an area of expected attack with an elevated acquisition radar whereby said aircraft is detected prior to its appearance above the horizon; processing data received from said radar for determining the azimuth, range, and velocity of said aircraft; transferring said processed data to a target tracking radar for positioning the azimuth and range of said target tracking radar; launching a missile prior to the appearance of said aircraft above the horizon; tracking said missile with a missile tracking radar; tracking said aircraft with said target tracking radar; computing a predicted point of intercept for said aircraft and said missile; and controlling said missile with said target tracking radar and said missile tracking radar for causing said missile to intercept said aircraft.

References Cited by the Examiner

UNITED STATES PATENTS

| 2,634,412 | 4/1953 | Meagher | 343—7 |
| 2,776,424 | 1/1957 | Lair et al. | 343—7 |
| 2,998,598 | 8/1961 | Braun et al. | 343—7 |
| 3,053,487 | 9/1962 | Baldwin et al. | 343—7 |
| 3,169,727 | 2/1965 | Schroader et al. | 244—14 |

BENJAMIN A. BORCHELT, *Primary Examiner.*

SAMUEL FEINBERG, *Examiner.*

T. A. ROBINSON, M. F. HUBLER, *Assistant Examiners.*